BEST AVAILABLE

H. BADCOCK.

ROPE-SOCKET FOR OIL-WELLS.

No. 7,719. Reissued June 5, 1877.

Witnesses

James A. Johnston,
Wesley Johnston

Inventor

Henry Badcock
By. A. C. Johnston
His Attorney

N. PETERS, PHOTO-LITHOGRAPHER, WASHINGTON, D. C.

UNITED STATES PATENT OFFICE.

HENRY BADCOCK, OF PITTSBURG, PENNSYLVANIA.

IMPROVEMENT IN ROPE-SOCKETS FOR OIL-WELLS.

Specification forming part of Letters Patent No. 133,290, dated November 26, 1872; reissue No. 7,719, dated June 5, 1877; application filed March 29, 1877.

*To all whom it may concern:*

Be it known that I, HENRY BADCOCK, of Pittsburg, in the county of Allegheny and State of Pennsylvania, have invented a certain new and useful Improvement in Rope-Socket for Oil-Wells; and I do hereby declare that the following is a full and exact description thereof, reference being had to the accompanying drawings, and to the letters of reference marked thereon.

The nature of my invention relates to a socket for attaching the rope to tools used in drilling oil-wells; and consists of a cylinder having a portion of its bore tapering, into which is fitted a tapering sleeve, made in two or more parts, the lower end of the bore of the cylinder being furnished with screw-threads adapted to the screw-threads of the tools used in drilling the wells, said cylinder—with or without the sleeve—being used for attaching the drilling-tools to the rope used in connection therewith, by enlarging or expanding the lower end of the rope to correspond with the coniform bore of the cylinder.

My invention also consists of making a portion of the cylinder, at its upper end, of less diameter outside than the lower portion of the cylinder, for the purpose of allowing the grappling or fishing tools to seize the upper portion of the cylinder for withdrawing it and the tools connected therewith from the well in case of breakage of the rope, or other accident, whereby the tools are lost in the well.

Figure 1:
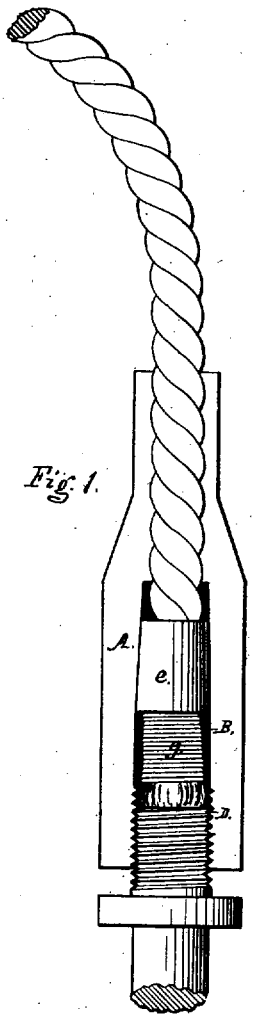
Figure 2:
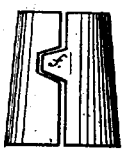

In the accompanying drawings, which form part of my specification, Figure 1 is a vertical section of my improvement in rope-socket. Fig. 2 is a side view of the sleeve.

In the drawings, A represents a metal cylinder, having a portion of its bore B tapering, the lower end of said bore being furnished with screw-threads, to which is fitted the screw D of the sinker-bar, or the screw of other parts of oil-tools. *e* is a tapering sleeve, made in two parts, having a dovetail, as indicated at *f*, for holding the parts in juxtaposition. The taper of this sleeve corresponds to the taper in the bore of the metal cylinder A. The end of the rope is passed through the bore of the cylinder A, and is then wrapped with twine or other suitable material, as indicated at *g*. The sleeve *e* is then placed around the wrapped portion of the rope, and the rope and sleeve drawn up in the taper portion of the bore. The screw D, pressing up on the end of the rope and on the end of the sleeve, will force the rope and sleeve up in the tapering bore of the cylinder A, so as to cause the sleeve to press against the sides of the wrapped portion of the rope, thereby holding it firmly and securely in the cylinder A, thus forming a sure attachment of the rope to the sinker-bar or other parts of oil-tools. The rope may be secured in the cylinder without the use of the sleeve, as represented in Fig. 3, by simply wrapping the lower end of the rope, as hereinbefore described, or by otherwise enlarging or expanding it to correspond to the coniformed bore of the cylinder. The means for enlarging or expanding the lower end of the rope will readily suggest themselves to the skilled mechanic and operator.

The upper end of the cylinder A is of less diameter outside than the lower part of it. This reduction should be sufficient to allow the grappling or fishing tools to pass down between the walls of the well or casing and the outer wall of the reduced portion of the cylinder A, for grappling the tools in case of becoming lost in the well. This reduction of the diameter of the upper portion of the cylinder is an important feature in the construction of the rope-socket, for without such reduction of the diameter it would be almost impossible to recover the lost tools.

Having thus described my improvement, what I claim is—

1. The herein-described cylindrical socket A for connecting the rope with the drilling-tools employed in oil-wells, the same having its upper end formed with a diminished diameter, and with a bore through which the rope passes, commencing at the upper terminus of the coniform bore of the rope-socket, substantially as shown and set forth.

2. In a socket for connecting the rope with the drilling-tools employed in oil-wells, the combination of the cylinder A, tapering sleeve *e*, and screw D, with the wrapped end of the rope, substantially as herein described, and for the purpose set forth.

HENRY BADCOCK.

Witnesses:

A. C. JOHNSTON,
WESLEY JOHNSTON.